(12) United States Patent
Huang

(10) Patent No.: US 8,007,268 B2
(45) Date of Patent: Aug. 30, 2011

(54) CLAMP ASSEMBLY FOR CLAMPING INJECTION MOLDING COMPONENT

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 156 days.

(21) Appl. No.: 12/622,715

(22) Filed: Nov. 20, 2009

(65) Prior Publication Data

US 2010/0291253 A1   Nov. 18, 2010

(51) Int. Cl.
*B29C 45/38* (2006.01)
(52) U.S. Cl. .......... 425/315; 83/382; 264/161; 425/229; 425/444; 425/554; 425/DIG. 51
(58) Field of Classification Search ............... 425/215, 425/229, 232, 315, 444, 472, 554, DIG. 51; 264/161; 83/375, 382
See application file for complete search history.

(56) References Cited

U.S. PATENT DOCUMENTS

| | | | |
|---|---|---|---|
| 3,669,592 A * | 6/1972 | Miller | 425/289 |
| 6,537,055 B2 * | 3/2003 | Adachi | 425/315 |
| 7,708,919 B2 * | 5/2010 | Patterson et al. | 264/161 |

* cited by examiner

*Primary Examiner* — James Mackey
(74) *Attorney, Agent, or Firm* — Altis Law Group, Inc.

(57) ABSTRACT

A clamp assembly includes a base, a clamp, a cutting blade, and a connecting shaft. The clamp includes a first claw pivotably connected to the base via a first rotating shaft, and a second claw movable relative to the first claw and pivotably connected to the base via a second rotating shaft. The cutting blade is coupled to an end of the second rotating shaft away from the clamp. The connecting shaft has one end fixed to the second claw and the other end fixed to the cutting blade for making the cutting blade capable of rotating along the second rotating shaft together with the second claw.

18 Claims, 4 Drawing Sheets

CLAMP ASSEMBLY FOR CLAMPING INJECTION MOLDING COMPONENT

BACKGROUND

1. Technical Field

The present disclosure relates to clamp assemblies and, particularly, to a clamp assembly for clamping injection molding component.

2. Description of Related Art

Injection molding machines are commonly used to manufacture plastic components, such as plastic lens, lens barrel etc. These injection molding components are usually taken out of the injection molding machine using a clamp after being molded. Because the melted plastic adjacent to the molding material inlet of the injection molding machine solidifies slowly, and usually remains liquid state when the injection molding component is taken out of the injection molding machine, the melted plastic adjacent to the molding material inlet may forms a string connecting to the injection molding component. The string is not benefit for taking out of the injection molding component from the injection molding machine.

What is needed, therefore, is a clamp assembly for clamping injection molding component with a cutter blade to overcome the above-described problem.

BRIEF DESCRIPTION OF THE DRAWINGS

Many aspects of the present clamp assembly can be better understood with reference to the accompanying drawings. The components in the drawings are not necessarily drawn to scale, the emphasis instead being placed upon clearly illustrating the principle of the present clamp assembly. In the drawings, all the views are schematic.

DETAILED DESCRIPTION

Embodiments of the present disclosure will now be described in detail below, with reference to the accompanying drawings.

Figure 1:
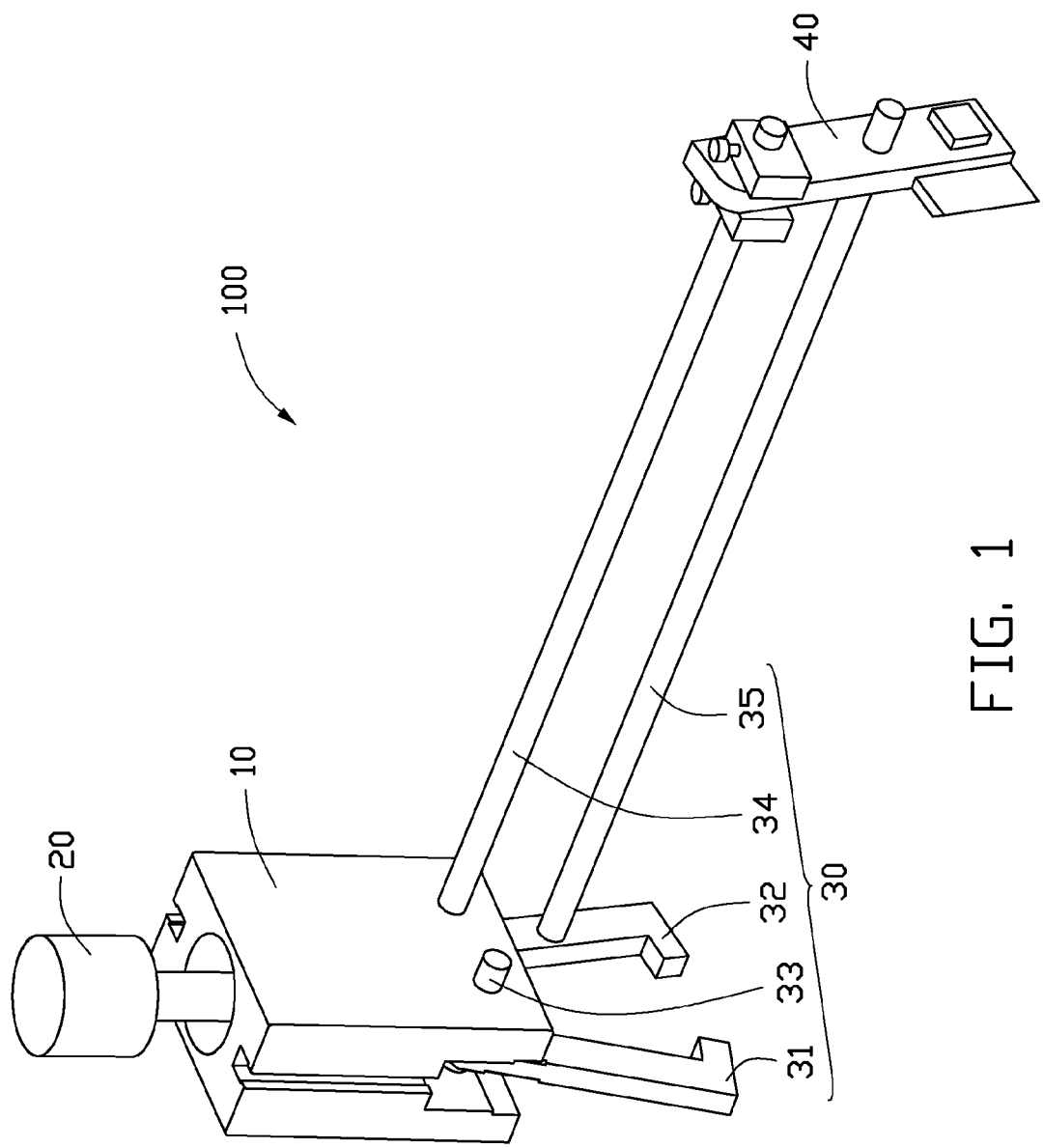
FIG. 1 is a schematic, isometric view of a clamp assembly according to an exemplary embodiment.
Figure 2:
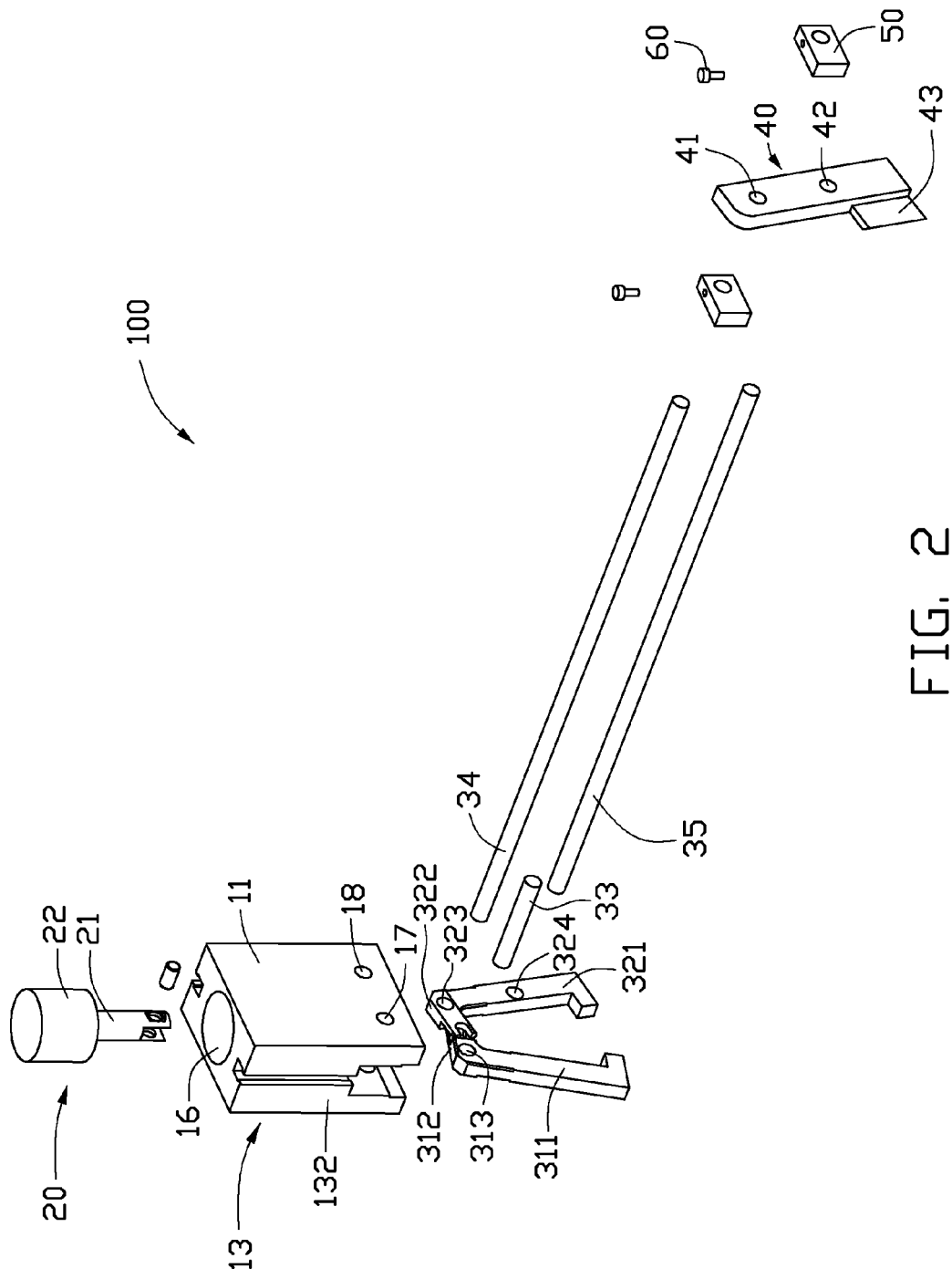
FIG. 2 is a schematic, exploded view of the clamp assembly of FIG. 1.

Referring to FIGS. 1 and 2, a clamp assembly 100 according to an exemplary embodiment, is shown. The clamp assembly 100 includes a base 10, an operation member 20, a clamp 30, and a cutting blade 40.

Figure 3:
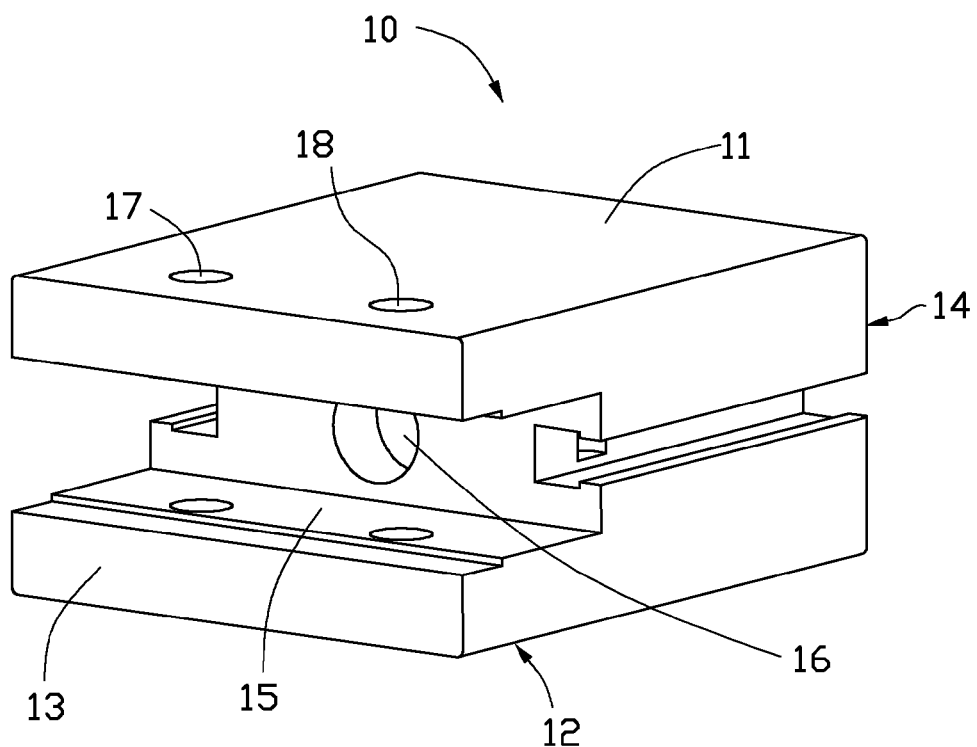
FIG. 3 is a schematic, isometric view of a base of the clamp assembly of FIG. 1.

Further referring to FIG. 3, the base 10 includes a front surface 11 facing towards the cutting blade 40, a rear surface 12 opposite to the front surface 11, a bottom surface 13, and a top surface 14. The base 10 defines a recess 15 on the bottom surface 13, and a receiving hole 16 on the top surface 14. The receiving hole 16 is communicated with the recess 15. The base 10 further defines a first through hole 17 and a second through hole 18 substantially perpendicular to the front surface 11 and the rear surface 12. The first through hole 17 and the second through hole 18 extend through the front surface 11 and the rear surface 12, and are communicated with the recess 15.

The operation member 20 includes a connecting pole 21 and an operation portion 22 fixed to an end of the connecting pole 21. The connecting pole 21 is received in the receiving hole 16 of the base 10, and the operation member 20 extends out of the receiving hole 16 for being conveniently operated by operators. The operation member 20 is slidable in the receiving hole 16 of the base 10.

The clamp 30 includes a first claw 31, a second claw 32 movable relative to the first claw 31, a first rotating shaft 33, a second rotating shaft 34, and a connecting shaft 35.

The first claw 31 includes a first clamping arm 311 and a first driving portion 312 disposed at two ends of the first claw 31 respectively. The first claw 31 further defines a first shaft hole 313 located between the first clamping arm 311 and the first driving portion 312. The first claw 31 is pivotably connected to the base 10. In the present embodiment, the first driving portion 312 of the first claw 31 is received in the recess 15 of the base 10, and the first rotating shaft 33 runs through the first through hole 17 of the base 10 and the first shaft hole 313 of the first claw 31. The first rotating shaft 33 can be fixed to one of the first claw 31 and the base 10, and rotated relative to the other. The first driving portion 312 is connected to the connecting pole 21 of the operation member 20, therefore, the first claw 31 can be driven to move towards or away from the second claw 32 by the operation member 20.

The second claw 32 is similar to the first claw 31. The second claw 32 includes a second clamping arm 321 and a second driving portion 322, and defines a second shaft hole 323. The second clamping arm 321 is configured for clamping injection molding components cooperatively with the first clamping arm 311. The second driving portion 322 is received in the recess 15 of the base 10, and the second rotating shaft 34 has one end running through the second through hole 18 of the base 10 and the second shaft hole 323 of the second claw 32. The second driving portion 322 is connected to the connecting pole 21 of the operation member 20. The second claw 32 further defines a third shaft hole 324 on the second clamping arm 321 thereof. The connecting shaft 35 connects the second claw 32 to the cutting blade 40 and is substantially parallel to the second rotating shaft 34.

The cutting blade 40 defines a through hole 41 corresponding to the second rotating shaft 34. Therefore, the second rotating shaft 34 extends through the cutting blade 40 which is then pivotably connected the base 10 via the second rotating shaft 34. Two limiting blocks 50 sleeves on the second rotating shaft 34, and the cutting blade 40 is located between the two limiting blocks 50. The two limiting blocks 50 can be fixed to the second rotating shaft 34 by two screws 60 respectively, therefore, the position of the cutting blade 40 on the second rotating shaft 34 can be limited by the two limiting blocks 50. The two limiting blocks 50 are movable on the second rotating shaft 34 by loosing the two screws 60. The cutting blade 40 further defines a through hole 42 corresponding to the connecting shaft 35. The connecting shaft 35 has one end inserted into the through hole 42 of the cutting blade 40, and the other end inserted into the third shaft hole 324 of the second claw 32. Therefore, the cutting blade 40 can rotate along the second rotating shaft 34 together with the second claw 32. The cutting blade 40 is substantially parallel to the front surface 11 of the base 10.

Figure 4:
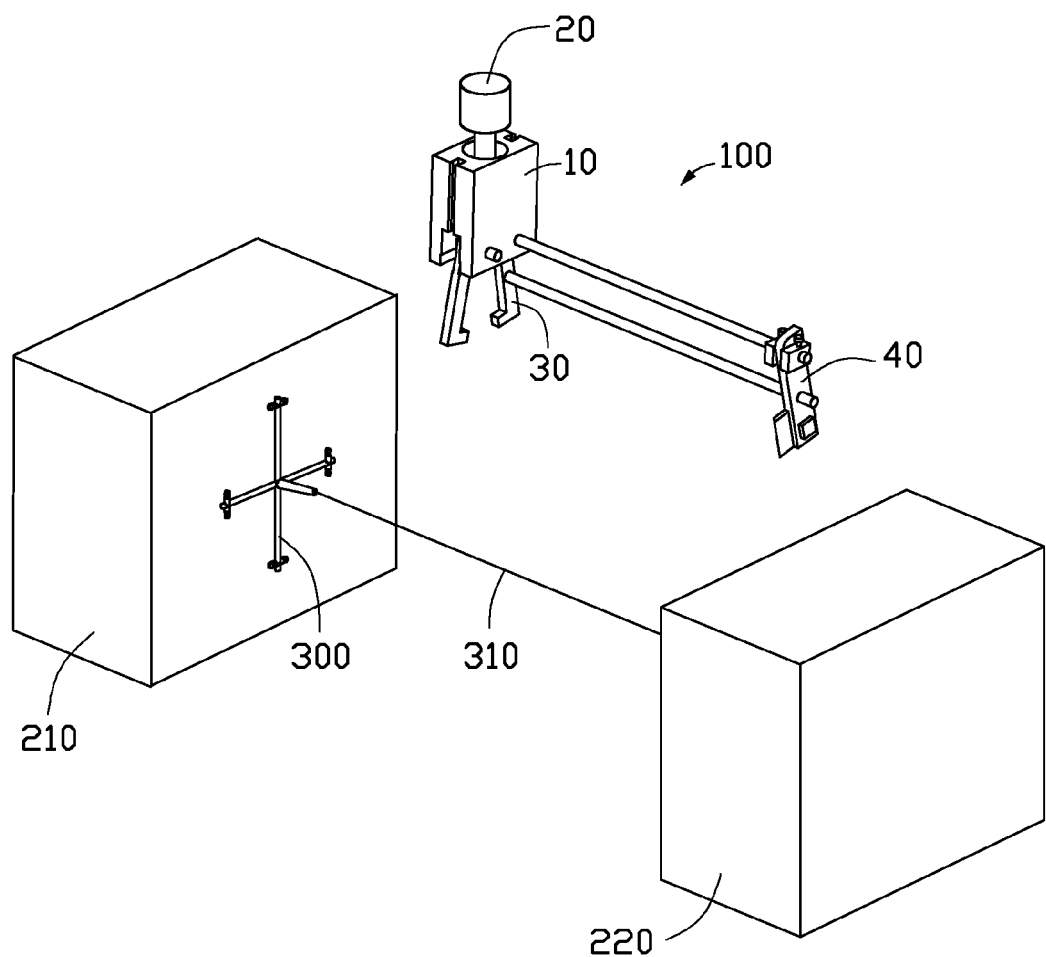
FIG. 4 is a schematic, isometric view of the clamp assembly of FIG. 1 in a working state thereof.

Referring to FIG. 4, after an injection molding process, a first die 210 and a second die 220 with a molding material inlet (not shown) thereon are separated from each other, the melted plastic adjacent to the molding material inlet forms a string 310 connected to an injection molding component 300. The clamp assembly 100 of the present embodiment can clamp the injection molding component 300 using the clamp

30, at the same time, the cutting blade 40 can cut the string 310. Therefore, injection molding component 300 can taken out of the first die 210 easily.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A clamp assembly comprising:
   a base;
   a clamp comprising:
      a first rotating shaft;
      a second rotating shaft;
      a first claw pivotably connected to the base via the first rotating shaft; and
      a second claw movable relative to the first claw, the second claw being pivotably connected to the base via the second rotating shaft,
   a cutting blade coupled to an end of the second rotating shaft away from the clamp; and
   a connecting shaft with one end fixed to the second claw and the other end fixed to the cutting blade for enabling the cutting blade to rotate about the second shaft together with the second claw.

2. The clamp assembly of claim 1, wherein the base comprises a front surface facing towards the cutting blade and a rear surface opposite to the front surface, and first rotating shaft and the second rotating shaft are substantially perpendicular to the front surface of the base.

3. The clamp assembly of claim 2, wherein the base comprises a bottom surface, and defines a recess on the bottom surface, the base further defines a first through hole and a second through hole for receiving the first rotating shaft and the second rotating shaft respectively therethrough, the first through hole and the second through hole communicate with the recess.

4. The clamp assembly of claim 3, wherein the first claw comprises a first clamping arm and a first driving portion disposed at two ends of the first claw respectively, and defines a first shaft hole between the first clamping arm and the first driving portion corresponding to the first rotating shaft; and the second claw comprises a second clamping arm and a second driving portion disposed at two ends of the second claw respectively, and defines a second shaft hole between the second clamping arm and the second driving portion corresponding the second rotating shaft.

5. The clamp assembly of claim 4, wherein the end of the connecting shaft fixed to the second claw is fixed to the second clamping arm of the second claw.

6. The clamp assembly of claim 4, wherein the first driving portion and the second driving portion are received in the recess of the base.

7. The clamp assembly of claim 6, wherein the base further comprises a top surface opposite to the bottom surface thereof, the base defines a receiving hole on the top surface communicating with the recess; the clamp assembly further comprises an operation member connected to the first driving portion of the first claw and the second driving portion of the second claw.

8. The clamp assembly of claim 7, wherein the operation member comprises a connecting pole and an operation portion fixed to an end of the connecting pole, the connecting pole is received in the receiving hole of the base, and the operation member extends out of the receiving hole.

9. The clamp assembly of claim 1, wherein the connecting shaft is substantially parallel to the second rotating shaft.

10. A clamp assembly comprising:
    a base;
    a clamp comprising:
       a first claw pivotably connected to the base;
       a second rotating shaft; and
       a second claw movable relative to the first claw, the second claw being pivotably connected to the base via the second rotating shaft,
    a cutting blade coupled to an end of the second rotating shaft distal from the base; and
    a connecting shaft with one end fixed to the second claw and the other end fixed to the cutting blade for enabling the cutting blade to rotate about the second rotating shaft together with the second claw.

11. The clamp assembly of claim 10, wherein the base comprises a front surface facing towards the cutting blade and a rear surface opposite to the front surface, and the second rotating shaft is substantially perpendicular to the front surface of the base.

12. The clamp assembly of claim 11, wherein the base comprises a bottom surface, and defines a recess on the bottom surface, the base further defines a second through hole for receiving the second rotating shaft, the second through hole is communicated with the recess.

13. The clamp assembly of claim 12, wherein the second claw comprises a second clamping arm and a second driving portion disposed at two ends of the second claw respectively, and defines a second shaft hole between the second clamping arm and the second driving portion corresponding the second rotating shaft.

14. The clamp assembly of claim 13, wherein the end of the connecting shaft fixed to the second claw is fixed to the second clamping arm of the second claw.

15. The clamp assembly of claim 13, wherein the second driving portion is received in the recess of the base.

16. The clamp assembly of claim 15, wherein the base further comprises a top surface opposite to the bottom surface thereof, the base defines a receiving hole on the top surface communicating with the recess; the clamp assembly further comprises an operation member connected to the second driving portion of the second claw.

17. The clamp assembly of claim 16, wherein the operation member comprises a connecting pole and an operation portion fixed to an end of the connecting pole, the connecting pole is received in the receiving hole of the base, and the operation member extends out of the receiving hole.

18. The clamp assembly of claim 10, wherein the connecting shaft is substantially parallel to the second rotating shaft.

\* \* \* \* \*